3,138,522
SYNERGISM OF ORGANOPHOSPHORUS INSECTICIDES

Frederick W. Plapp, Jr., and Gaines W. Eddy, Corvallis, Oreg., assignors to the United States of America as represented by the Secretary of Agriculture
No Drawing. Filed Jan. 15, 1962, Ser. No. 166,436
2 Claims. (Cl. 167—30)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to the synergism of organophosphorus insecticides and to insecticide composition containing such organophosphorus insecticides together with the hereinbelow described synergists. More particularly, the invention relates to the use of certain classes of tris-substituted phosphoric acid derivatives to synergize organophosphorus insecticides and to such synergized compositions.

A comparatively recent development in the field of insecticides has been the introduction of a class of toxicants belonging to the broad class which may be designated as organophosphorus compounds. Notable among these insecticides are malathion, S-[1,2-bis(ethoxycarbonyl)ethyl] O,O-dimethyl phosphorodithioate, and parathion, O,O-diethyl O-p-nitrophenyl phosphorothioate.

As with the earlier insecticides, ways have been sought to increase the toxicity of these compounds to susceptible insects, to broaden their spectrum of activity to include resistant insects and insects which develop a resistance, and to lower the cost of compositions containing these compounds by adding to such composition lower-costing substances capable of intensifying the activity of the toxicants.

One object of this invention, therefore, is to provide synergists for organophosphorus insecticides. Another object is to provide a class of synergists capable of extending the toxicity of organophosphorus insecticides to insects resistant to these insecticides. Other objects will become apparent from the following detailed description of the invention and from the specific examples.

In general, in accordance with this invention, it has been found that organophosphorus insecticides are synergized by the addition of tris-substituted phosphoric acid derivatives.

Among the organophosphorus insecticides synergized according to this invention, in addition to the malathion and parathion already mentioned, are Dipterex (dimethyl 2,2,2 - trichloro-1 - hydroxyethylphosphonate), ronnel ((O,O-dimethyl O-2,4,5-trichlorophenyl)phosphorothioate), Ruelene (4-tert-butyl-2-chlorophenyl methyl methylphosphoramidate), Diazinon (O,O-diethyl O-(2-isopropyl-4-methyl-6-pyrimidinyl) phosphorothioate), and Bayer 29493 (O,O-dimethyl O-(4-methylthio-m-tolyl)phosphorothioate), and the like.

The synergists of this invention comprise tris-substituted derivatives of phosphoric acid which, themselves, are not toxic to insects and include both the aliphatic and aromatic derivatives. Among these derivatives are:

Tri-o-tolyl phosphate ($TCP_5$)
Tri-o-tolyl phosphorothioate ($ToTTP_5$)
Tri-p-tolyl phosphite ($TpTP_3$)
Triphenyl phosphate ($TPP_5$)
Triphenyl phosphite ($TPP_3$)
Tri-n-butyl phosphate ($TBP_5$)
Tri-n-butyl phosphite ($TBP_3$)
Tributyl phosphorotrithioite ($TBTP_3$)
Tributyl phosphorotrithioate ($TBTP_5$)
Triethyl phosphate ($TEP_5$)
Triethyl phosphite ($TEP_3$)
Trimethyl phosphorotetrathioate ($TMTP_5$)
Tri-m-tolyl phosphate ($TmTP_5$)

For purposes of brevity, the above synergists are each designated by an abbreviation which will be used in the tables below to indicate the particular substance used.

The following examples, as set forth in the tables, are illustrative of the invention. Since it will be apparent to those skilled in the art that other insecticides and synergists belonging to the respective classes disclosed fall within the scope of the invention, the latter should not be construed as being limited by the said illustrative examples.

To demonstrate the present invention, tests were made with the house fly, *Musca domestica* L., and the mosquito, *Culex tarsalis* (Coq.). The house fly strains were the insecticide-susceptible Orlando Regular, the Tropical "P," selected with parathion and about 10 times resistant to it, and the Grothe strain, selected by exposure to malathion and about 100 times resistant to it. The flies were tested as adult females, 2 to 5 days old. The mosquito strains were the susceptible laboratory colony and a malathion-resistant strain first collected in the Fresno, California, area in 1957. Mosquitos were tested either as fourth-instar larvae or as 1–2 day old adult females.

The flies were tested by exposing female adults to films of the insecticide:synergist combinations in one-pint glass jars with a total inner surface area of approximately one quarter of a square foot. The jars were treated by pipetting into them the required amounts of the insecticide and synergist (0.3–1.0 ml.) in acetone. The solvent was then evaporated and two additional ml. of acetone added. The jars were rolled on their sides until the solvent was evaporated. Groups of 20 adult flies were placed in the jars within an hour of treatment, the jars were covered with perforated aluminum foil, and the flies fed sugar water from a cotton-soaked pad. Mortality determinations were made after 24 hours.

The mosquito larvicide tests were made by placing 25 fourth-instar larvae in 250 ml. of distilled water in one-pint glass jars containing the required amounts of insecticide and synergist. Mortality determinations were made 24 and 48 hours later. For tests with mosquito adults, the insects were placed in small screen cages and sprayed (fine mist) with 0.1 ml. amounts of different concentrations of the insecticide:synergist mixtures dissolved in a light oil. All mixtures of insecticide and synergist were prepared on a weight:weight basis. Treated insects were held in a room at approximately 80° F. and 60% relative humidity.

The results of a series of tests are given in the tables below.

TABLE 1

*The Effect of Some Tris-Substituted Phosphoric Acid Derivatives on the Toxicity of Malathion to Resistant House Flies*

| Combination Tested | 24 hour LC-50 in μgm./jar | | Increase in Toxicity | |
|---|---|---|---|---|
| | 1:1 | 1:10 | 1:1 | 1:10 |
| Malathion only | 1,800 | | | |
| M[1]+TCP₅ | 800 | | 2.25 | |
| M+ToTTP₅ | 800 | | 2.25 | |
| M+TpTP₃ | 800 | | 2.25 | |
| M+TPP₅ | 80 | 50 | 22 | 36 |
| M+TPP₃ | 250 | | 7.2 | |
| M+TBP₅ | 900 | | 2 | |
| M+TBP₃ | 800 | | 2.25 | |
| M+TBTP₃ | 40 | 18 | 45 | 100 |
| M+TBTP₅ | 25 | 20 | 72 | 90 |
| M+TEP₅ | 700 | | 2.6 | |
| M+TEP₃ | 1,000 | | 1.8 | |
| M+TMTP₅ | 200 | 40 | 9 | 45 |

[1] Malathion.

TABLE 2

*The Effect of Some Tris-Substituted Phosphoric Acid Derivatives on the Toxicity of Malathion to Susceptible House Flies*

| Combination Tested | 24 hour LC-50 in μgm./jar | | Increase in Toxicity | |
|---|---|---|---|---|
| | 1:1 | 1:10 | 1:1 | 1:10 |
| Malathion only | 17 | | | |
| M[1]+TPP₅ | 17 | 25 | 1.0 | 0.7 |
| M+TBTP₅ | 9 | 10 | 1.9 | 1.7 |
| M+TBTP₃ | 12 | 13 | 1.4 | 1.3 |
| M+TMTP₅ | 17 | 13 | 1.0 | 1.3 |

[1] Malathion.

TABLE 3

*The Effect of Some Tris-Substituted Derivatives of Phosphoric Acid on the Toxicity of Malathion to Resistant Larvae of the Mosquito Culex tarsalis (Coq.)*

| Combination tested | LC-50 in ppb[1] at indicated ratios and times | | | | Increase in toxicity | | | |
|---|---|---|---|---|---|---|---|---|
| | 1:1 | | 1:10 | | 1:1 | | 1:10 | |
| | 24 hr. | 48 hr. | 24 hr. | 48 hr. | 24 hr. | 48 hr. | 24 hr. | 48 hr. |
| Malathion only | 2,400 | 2,100 | | | | | | |
| M[2]+TCP₅ | 45 | 20 | 30 | 10 | 53 | 105 | 80 | 210 |
| M+TmTP₅ | 60 | | 40 | | 40 | | 60 | |
| M+TotTP₅ | 220 | 60 | | | 11 | 35 | | |
| M+TptP₃ | 150 | 100 | | | 16 | 21 | | |
| M+TPP₅ | 24 | 15 | 25 | 20 | 100 | 140 | 96 | 105 |
| M+TPP₃ | 70 | 45 | | | 34 | 47 | | |
| M+TBP₅ | >1,000 | >1,000 | | | <2 | <2 | | |
| M+TBP₃ | 400 | 300 | | | 6 | 7 | | |
| M+TBTP₅ | 30 | 18 | 14 | 8 | 80 | 117 | 170 | 260 |
| M+TBTP₃ | 25 | 14 | 15 | 8 | 96 | 150 | 160 | 260 |
| M+TEP₅ | >1,000 | >1,000 | | | <2 | <2 | | |
| M+TEP₃ | >1,000 | >1,000 | | | <2 | <2 | | |
| M+TMTP₅ | >1,000 | >1,000 | | | <2 | <2 | | |

[1] PPB=parts per billion.
[2] Malathion.

TABLE 4

*The Effect of Some Tris-Substituted Phosphoric Acid Derivatives on the Toxicity of Malathion to Susceptible Larvae of the Mosquito, Culex tarsalis (Coq.)*

| Combination tested | LC-50 in ppb[1] at indicated ratios and times | | | | Increase in toxicity | | | |
|---|---|---|---|---|---|---|---|---|
| | 1:1 | | 1:10 | | 1:1 | | 1:10 | |
| | 24 hr. | 48 hr. | 24 hr. | 48 hr. | 24 hr. | 48 hr. | 24 hr. | 48 hr. |
| Malathion only | 25 | 16 | | | | | | |
| M[2]+TCP₅ | 14 | 7 | 22 | 8 | 1.7 | 2.3 | 1.2 | 2 |
| M+TmTP₅ | 15 | 8 | 18 | 8 | 1.7 | 2.0 | 1.4 | 2 |
| M+TPP₅ | 16 | 15 | 22 | 15 | 1.6 | 1 | 1.2 | 1 |
| M+TBTP₅ | 14 | 6 | 10 | 7 | 1.7 | 2.7 | 2.5 | 2.3 |
| M+TBTP₃ | 14 | 6 | 18 | 12 | 1.7 | 2.7 | 1.4 | 1.3 |

[1] PPB=parts per billion.
[2] Malathion.

TABLE 5

*The Effect of Some Tris-Substituted Phosphoric Acid Derivatives on the Toxicity of Malathion to Malathion-Resistant and -Susceptible Culex tarsalis (Coq.) Adult Females. Toxicant Applied as Sprays in Wind Tunnel Tests*

| Combination Tested | Percent Insecticide in Spray to Produce LC-50 | |
|---|---|---|
| | Resistant | Susceptible |
| Malathion only | 2 | 0.13 |
| M[1]+TCP₅ 1:1 | 0.8 | 0.13 |
| M+TPP₅ 1:1 | 0.23 | 0.15 |
| M+TBTP₃ 1:1 | 0.26 | 0.13 |
| M+TBTP₅ 1:1 | 0.22 | 0.16 |

[1] Malathion.

TABLE 6

*The Effect of a Series of Compounds Tested at 1 mg./Jar on the Toxicity of Parathion to Resistant and Susceptible House Flies*

| Combination tested | μgm./jar of parathion for LC-50 | | Increase in Toxicity | |
|---|---|---|---|---|
| | Resistant | Susceptible | Resistant | Susceptible |
| Parathion only | 6 | 0.8 | | |
| P+TBP₅ | 3 | 0.6 | 2 | 1.25 |
| P+TBTP₅ | 1 | 0.2 | 6 | 4 |

We claim:
1. An insecticide composition comprising
(a) parathion and
(b) as a potentiator, a member of the group consisting of
Tri-o-tolyl phosphate
Tri-o-tolyl phosphorothioate
Tri-p-tolyl phosphite
Triphenyl phosphate
Triphenyl phosphite
Tri-n-butyl phosphate
Tri-n-butyl phosphite
Tributyl phosphorotrithioite
Tributyl phosphorotrithioate
Triethyl phosphate
Triethyl phosphite
Trimethyl phosphorotetrathioate, and
Tri-m-tolyl phosphate

2. A method of killing insects comprising contacting insects with a composition comprising:
(a) parathion and
(b) as a potentiator, a member of the group consisting of
Tri-o-tolyl phosphate
Tri-o-tolyl phosphorothioate
Tri-p-tolyl phosphite
Triphenyl phosphate
Triphenyl phosphite
Tri-n-butyl phosphate
Tri-n-butyl phosphite
Tributyl phosphorotrithioite
Tributyl phosphorotrithioate
Triethyl phosphate
Triethyl phosphite
Trimethyl phosphorotetrathioate, and
Tri-m-tolyl phosphate

References Cited in the file of this patent
UNITED STATES PATENTS 2,990,316    Jones et al. _____ June 27, 1961
3,060,083    Fearing et al. _____ Oct. 23, 1962

OTHER REFERENCES

King: "Chemicals Evaluated as Insecticides," U.S. Dept. of Agriculture, Agriculture Handbook, No. 69, issued May 1954, pp. 266–267.

C.A., vol. 54, 1960, p. 25522c.